United States Patent [19]

Rothe

[11] Patent Number: 5,100,225
[45] Date of Patent: Mar. 31, 1992

[54] CONTACT LENS HAVING POSITION STABILIZATION

[75] Inventor: Eckhard Rothe, Schönkirchen, Fed. Rep. of Germany

[73] Assignee: Heinrich Wöhlk, Institut fur Contactlinsen GmbH & Co., Kiel, Fed. Rep. of Germany

[21] Appl. No.: 688,110

[22] Filed: Apr. 19, 1991

[30] Foreign Application Priority Data

Apr. 19, 1990 [DE] Fed. Rep. of Germany ....... 4012478

[51] Int. Cl.$^5$ .............................................. G02C 7/04
[52] U.S. Cl. ................................ 351/160 H; 351/161
[58] Field of Search ............... 351/160 R, 160 H, 161, 351/162

[56] References Cited

U.S. PATENT DOCUMENTS

| | | | |
|---|---|---|---|
| 3,591,264 | 7/1971 | Forrest et al. | 351/160 R |
| 3,698,802 | 10/1972 | Baron | 351/160 R |
| 4,095,878 | 6/1978 | Fanti | 351/161 |
| 4,787,732 | 11/1988 | Siviglia | 351/160 R |
| 4,850,689 | 7/1989 | Martin et al. | 351/161 |
| 4,859,049 | 8/1989 | Muller | 351/161 |

FOREIGN PATENT DOCUMENTS

| | | |
|---|---|---|
| WO89/07303 | 8/1889 | Australia . |
| 0042023 | 12/1981 | European Pat. Off. . |
| 2046389 | 3/1972 | Fed. Rep. of Germany . |
| 7034876 | 11/1974 | Fed. Rep. of Germany . |
| 2940352 | 4/1980 | Fed. Rep. of Germany . |
| 3003985 | 8/1981 | Fed. Rep. of Germany . |
| WO84/04724 | 12/1984 | PCT Int'l Appl. . |
| WO89/12246 | 12/1989 | PCT Int'l Appl. . |
| 2041557 | 9/1980 | United Kingdom . |
| 2117130 | 10/1983 | United Kingdom . |
| 2160677 | 12/1985 | United Kingdom . |

*Primary Examiner*—Scott J. Sugarman
*Attorney, Agent, or Firm*—Walter Ottesen

[57] ABSTRACT

Contact lenses having position stabilization are utilized in order to fix the position of the contact lens on the cornea of the eye of a person wearing the lens. For this purpose, thickened regions for adjusting a specific orientation relative to the eye of the wearer are provided on the convex outer surface of the contact lens outside of the optical zone. A reliable position stabilization of a contact lens on the eye is achieved in that at least two thickened regions are provided laterally of the vertical center axis. These thickened regions extend essentially below a horizontal center axis between the optical zone and the edge region and it is very advantageous if these thickened regions lie at least at one point on the lower eyelid when the eye is open. In this way, a rotation of the contact lens is avoided when the eye is open. Furthermore, it is advantageous when the contact of the thickened regions on the lower eyelid is maintained. Additional thickened regions can be provided on the outer surface by which the movement of the upper eyelid encounters resistance when moving downwardly. These additional thickened regions are arranged above the first-mentioned thickened regions. With this combination, an optimal position stabilization of the contact lens on the cornea of the eye is achieved. The possibility is also presented that the thickened regions can be configured that they provide static as well as dynamic position stabilization.

9 Claims, 2 Drawing Sheets

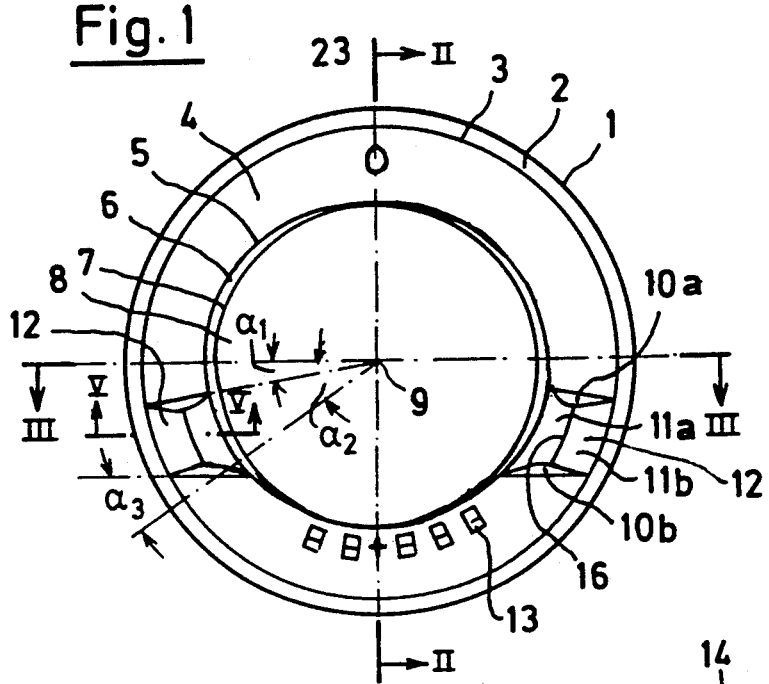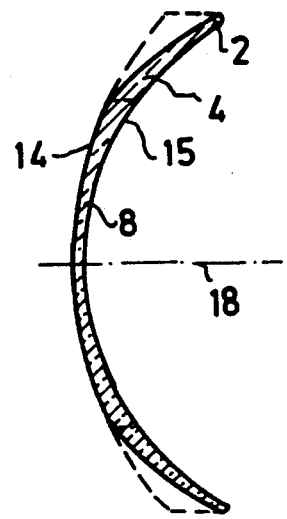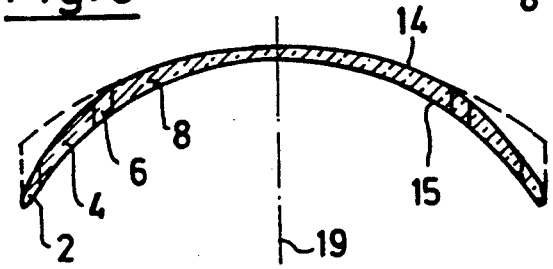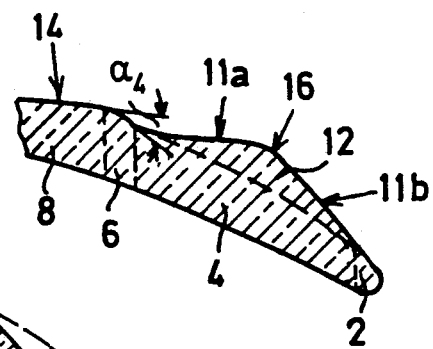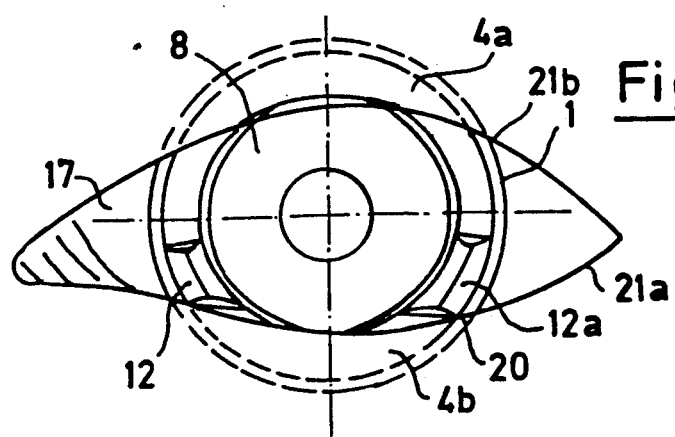

CONTACT LENS HAVING POSITION STABILIZATION

FIELD OF THE INVENTION

The invention relates to a contact lens with positional stabilization which is placed on the cornea of an eye of a person wearing the contact lens. The contact lens has a convex outer surface and has means for adjusting a specific orientation of the contact lens relative to the eye of the contact lens wearer. These means are provided outside of an optical zone on a peripheral region of the outer surface of the lens.

BACKGROUND OF THE INVENTION

Contact lenses having positional stabilization of the lens on the human eye correct, for example, axially-dependent ametropia of the eye such as astigmatism. The stabilization of the axial position of the contact lens prevents the rotational movement of the contact lens on the eye and assures the orientation of the contact lens even after a blinking of the eyelid. Various stabilization principles are known in order to obtain a positional stabilization of a contact lens on an eye.

The rotation of the contact lens on the eye can be prevented with a toric posterior surface if the corneal astigmatism of the eye is sufficiently great as disclosed in U.S. Pat. No. 4,787,732. However, this prerequisite is fulfilled only in the rarest of cases.

A very limited area of application is also provided for contact lenses which have an optical effect only for near vision. In this connection, reference may be had to German Patent 3,308,570 and U.S. Pat. Nos. 4,850,689 and 3,591,264.

Contact lenses having prismatic ballast have a stabilized position on the eye because of different thicknesses along the periphery of the contact lens and only a limited rotational movement occurs. Because of the increased weight of the lens in the lower region, the lens drops after each movement of the eyelid which pulls the lens out of the stabilized position and returns it to its use position as disclosed, for example, in U.S. Pat. No. 4,874,234. However, this thickening at the lower lens edge causes many wearers of contact lenses to experience a foreign-body sensation and the lens is therefore perceived as being disturbing. The same applies to contact lenses having a thickened edge in the lower lens region as suggested in German Patent 2,046,389 and German Utility Model Registration 7,034,876. A further disadvantage of contact lenses stabilized in this manner is that the oxygen permeability of a contact lens is greatly dependent on the thickness of the lens material in addition to the material itself and a high permeability with respect to oxygen must be required for a good compatibility of the contact lens on the eye.

German Patent 3,003,985 suggests that a stabilization can be achieved by permanently supporting the lens on the lower eyelid. However, the lower eyelid is subjected to a permanent irritation with the continuous support of the contact lens thereon with its entire weight. This irritation is perceived by the wearer of the contact lens especially when blinking.

The solutions for stabilization described above utilize static stabilization in order to suppress the movement of a contact lens on the eye of the wearer. However, there are also solutions for achieving stabilization which utilize dynamic stabilization. The dynamically stabilized contact lenses utilize the movement of both eyelids when blinking. In this way, the stabilization of the contact lens on the eye of the wearer takes place when the eyelids are closed.

A solution is known wherein the dynamic stabilization takes place by a reduction of the thickness at the outer surface of the lens at two regions which lie symmetrically to each other as suggested in U.S. Pat. No. 4,095,878 and British Patent 2,041,557. These regions are symmetrical to a center plane which is horizontal in the supporting position of the contact lens and these regions have a crescent-shaped configuration. In this way, the contact lens becomes thicker in the horizontal center plane than in the two crescent-shaped regions. When the eyelids are closed, the upper and lower eyelids of the eye glide over the contact lens and a pressure is applied to the contact lens because of the gradually increasing thickness of the contact lens in the crescent-shaped regions. This pressure is dependent upon the position of the contact lens on the eye and leads to an alignment of the contact lens. The alignment takes place with each blink of the lids whereas no stabilization takes place while the eye is open.

A further solution according to the dynamic stabilization principle is disclosed in U.S. Pat. No. 4,859,049 in which the contact lens is deliberately thickened in two outer regions in the horizontal center axis. These thickened regions lead to a targeted alignment of the contact lens when the eyelids are closed. Here too, the alignment takes place with each blink whereas no stabilization takes place when the eye is open.

SUMMARY OF THE INVENTION

It is an object of the invention to provide a reliable positional stabilization of a contact lens on the eye of a wearer thereof which considers the eyelid geometry and the movement thereof.

An optimal fit to the position of the eyelids in the majority of contact lens wearers is obtained by arranging the regions of different thickness essentially below the horizontal center axis. If, in contrast, these regions are arranged on the horizontal center axis, then the lower eyelid separates too soon from the stabilizing regions. This leads to an uncontrolled separation within certain limits from the thickened regions.

In order to make stabilization possible and according to a feature of the invention, two thickened regions are provided essentially below a center axis which is horizontal when the contact lens is in the position in which it is worn by the wearer. The size, the position, and the minimum height of the thickened regions are determined from the eyelid geometry and the eyelid mechanics. The thickened regions are arranged in an outer zone between the optical zone and the edge region of the contact lens so as to be lateral to a vertical center axis in order to provide an optimal lever action.

It is advantageous to provide at least one further means on the outer zone of the contact lens which offers a slight resistance to the downward movement of the upper eyelid during a blinking of the eyelids. This means must be arranged above the thickened regions on the outer zone of the contact lens.

The form of the thickened regions is advantageously so selected that each of the thickened regions lies against the lower eyelid at least at one point of its lower limit when the eye is opened. In addition to the dynamic position stabilization acting with each blink of the eyelids, a static positional stabilization is obtained also when the eye is open so that a separation of the upper eyelid from the thickened region provides no disturbance of the stabilization. For each movement of the eyelids, the means arranged above the thickened regions align the thickened regions on the lower eyelid.

With the contact lens according to the invention, a dynamic position stabilization can be combined with a static position stabilization for the first time and in this way a precise orientation of a contact lens on the cornea of the eye of the lens wearer is ensured at every point in time with the position stabilization not being dependent upon the thickness of the material of the overall contact lens. The stabilization of the contact lens on the cornea of the eye is then characterized by an alignment on the lower eyelid.

The thickened regions are configured so as to extend longitudinally and for this reason the stabilization of the contact lens on the eye can be characterized by a "latching" in the palpebral fissure.

The two thickened regions can also be used for the dynamic components of the stabilization. In that these two thickened regions are positioned in the lower contact lens half, the condition is achieved that the upper eyelid experiences only the slightest hindrance after a stabilization of the contact lens on the cornea. The contact lenses in this way provide a comfort similar to known spherical contact lenses.

It is advantageous to manufacture the entire contact lens from a blank so that the thickened regions and the remainder of the contact lens are made of one and the same material thereby reducing production costs.

A substantial reduction of the foreign-body sensation is obtained in that the thickened regions are beveled on mutually opposite ends. In this connection, it is especially advantageous that the upper and lower bevel each define a concave surface while the inner and outer bevels each have a convex surface.

The stabilization of the contact lens achieved according to the invention makes it possible to configure the optical zone so as to be almost circularly shaped with the size of this optical zone being very large relative to the diameter of the overall contact lens. This enables the optical zone to be provided with a toric surface in order to correct directionally-dependent ametropia or to make possible sharp viewing at several distance ranges.

A better fit to the form of the upper eyelid is achieved in that the upper boundary line of the thickened regions is aligned to the center point of the lens.

Means can be provided on the surface of the outer zone of the lens for determining the position of the contact lens on the eye in order that the position of the contact lens relative to the cornea of the eye can be better determined with a fit and check by a technician. This means, or if required, other means is also advantageous to facilitate a position-correct seating of the contact lens on the cornea of the eye of the wearer thereof.

It is irrelevant if the contact lens is made of soft or hard material; however, the stabilization principle is especially advantageous for a soft contact lens.

BRIEF DESCRIPTION OF THE DRAWINGS

The invention will now be described with reference to the drawings wherein:

FIG. 1 is a plan view of an embodiment of the contact lens of the invention wherein two thickened regions are disposed on the outer zone of the lens;

FIG. 2 is a vertical section taken along line II—II of FIG. 1;

FIG. 3 is a horizontal section taken along line III—III of FIG. 1;

FIG. 4 is a contact lens according to the invention seated on the cornea of an eye;

FIG. 5 is a detail section view of a portion of the contact lens to show a thickened region thereof; and, FIG. 6 is a plan view of another embodiment of the contact lens of the invention wherein two additional thickened regions are provided on the outer zone of the lens.

DESCRIPTION OF THE PREFERRED EMBODIMENTS OF THE INVENTION

Figure 6:
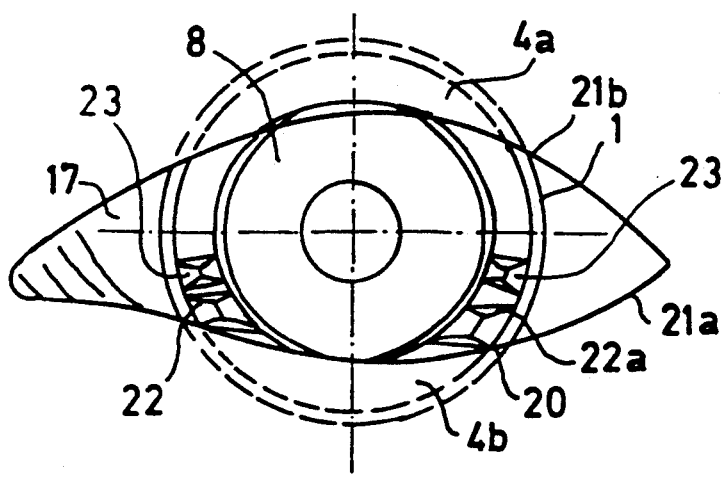

The circular contact lens 1 shown in FIGS. 1 to 5 is made of a soft material. The lens 1 has a convex outer surface 14 and a concave inner surface 15. When worn, the contact lens is seated with the inner surface 15 on the cornea of the eye 17. The inner surface 15 of the contact lens 1 is fitted in its form to the form of the cornea of the eye 17. The outer surface 14 of the contact lens 1 is subdivided into several zones.

The optical zone 8 is disposed in the central part of the contact lens 1. This optical zone 8 has a shape which is virtually circular and has the lens center 9 at its circular center. The outer surface 14 has a toric surface in the region of the optical zone 8.

A connecting zone 6 is provided between the toric optical zone 8 and a lens outer zone 4. In this connecting zone 6, the adaptation of the outer surface 14 from the torically formed optical zone 8 to the spherically formed lens outer zone 4 takes place.

The peripheral region 2 follows after the lens outer zone 4 which is essentially spherical. The peripheral region 2 is so formed that the contact lens 1 generates the least possible resistance for the slide-on movement of the eyelids (21a, 21b) when a movement on the cornea of the eye takes place. This is important so that the contact lens 1 will be perceived as being comfortable by the wearer of the contact lens on the eye 17.

The region of the optical zone 8 corrects for the ametropia of the contact lens wearer. In principle, the optical zone 8 can also have a spherical surface. In this case, a position stabilization of the contact lens 1 on the eye 17 would then not be necessary. Especially axis-dependent ametropia can be corrected with a torically formed surface of the optical zone 8. With an appropriate configuration of the surface of the optical zone, several distance ranges can be clearly recognized by an ametropic contact lens wearer.

Two thickened regions 12 are disposed on the lens outer zone 4. These thickened regions 12 are arranged below a center axis 18, which is horizontal in the wearing position of the contact lens 1, and are arranged symmetrically to a vertical center axis 19. The regions 12 adjust a specific position orientation of the contact lens 1 relative to the eye 17 of the contact lens wearer.

The thickened regions 12 lie with at least one point 20 of their lower boundary line on the lower eyelid 21a in order to ensure a reliable orientation with respect to position at any time.

The thickened regions 12 are made of the same material as the remainder of the contact lens 1 and are produced by surface processing the outer surface 14 of the contact lens 1. The regions 12 have a longitudinal form and have a central rise 16 which extends longitudinally with the thickened regions 12 extending only on the outer zone 4 of the lens. Laterally, the thickened regions 12 terminate on the one hand at the partition line 3 between the edge region 2 and the outer zone 4 and, on the other hand, at the partition line 5 between the lens outer zone 4 and the connecting zone 6. The extent of the thickened regions on the ring-shaped lens outer zone 4 is greater along the periphery of the outer zone 4 than between the two partition lines (3, 5).

The two thickened regions 12 are beveled on all sides with the upper and lower bevels (10a, 10b) being steeper than the inner and outer bevels (11a, 11b). With this measure, the condition is obtained that the central rise 16 has an angle a flat as possible and, with an eyelid closure, the central rise 16 is not perceived as being disturbing by an eyelid after sliding upon the thickened region 12. The steeper dropping upper and lower bevels (10a, 10b) provide for a good positioning of the contact lens 1 on the eye 17.

An angle $\alpha_1$ is conjointly defined by the horizontal center axis 18 and the upper boundary of the thickened region 12. An angle $\alpha_2$ is conjointly defined by the horizontal center axis 18 and the center point of the lower boundary of the thickened region 12. The angle $\alpha_1$ lies in the range of ±30° about the horizontal center axis 18; whereas, the angle $\alpha_2$ can lie in the range between 5° and 80°. However, it is more advantageous if angle $\alpha_1$ lies in the range of 0° to 20° and $\alpha_2$ in the range of 40° to 80°. The angle $\alpha_3$ between the center point of the lower boundary of the thickened region 12 and the lower boundary line of the thickened region 12 can lie in the range of 20° to 80° and is advantageously in the range between 35° and 75°. An excellent combination of angles has been determined as follows: $\alpha_1 = 10°$; $\alpha_2 = 60°$; and, $\alpha_3 = 65°$.

The angles between the upper and lower bevels (10a, 10b) can lie in the range of between 5° and 45° with an optimal angle of approximately 12°. The angle of the inner bevel 11a lies advantageously in the range between 20° and 45° and the angle between the outer bevel 11b in the range between 55° and 65°. The angles are referred to an imaginary concentric line on the outer zone 4 of the lens. The upper and lower bevels (10a, 10b) are configured as inwardly curved surfaces. The inner and outer bevels are surfaces curved outwardly so that the central rise 16 is unrecognizably present since a continuous course from the inner to the outer bevel is provided. The inwardly curved surfaces of the upper and lower bevels (10a, 10b) make possible on the one hand a smooth slide-on of the upper eyelid 21b and, on the other hand, a contact of the lower boundary of the thickened region 12 on the lower eyelid 21a which is perceived as being comfortable. The bevels (11a, 11b) are arcuately curved outwardly and inwardly and provide for a central rise 16 with a continuous surface which is as flat as possible. This can be improved by polishing. The outer surfaces (10a, 10b; 11a, 11b) are in this configuration of the surfaces (10a, 10b; 11a, 11b) segments of a cylindrical wall.

The connecting zone 6 falls off at an angle $\alpha_4$ which can amount to at most 70° with a range between 30° to 60° being advantageous.

The two thickened regions 12 have the same extent in FIG. 1. With a different size of the two thickened regions 12, an improved action of the position stabilization can be achieved (see FIG. 4) with the longer thickened region 12a being disposed on the side of the eye facing toward the nose. In this way, the individual eyelid relationships of the wearer of the contact lens can be considered in that the magnitude of the thickened regions 12 can be carried out pursuant to a prescription.

The thickened regions 12 must have a minimum elevation in order to fulfill their assigned task in a proper manner. If the elevation above the normal outer surface 14 is measured at the location of the central rise 16, then an optimal elevation lies at approximately 0.4 mm. This elevation is dependent upon the eyelid geometry such as eyelid radius, position of the eyelids to one another, form of the palpebral fissure, position of the eyelids on the cornea of the eye 17 and the mechanics of the eyelids such as eyelid closure frequency and eyelid pressure. An optimal fine adjustment can be obtained for each contact lens wearer with a limited number of experiments.

The lens has an inscription 13 or engraving in its lower region at the area of the outer zone 4 thereof so that the contact lens 1 can be more easily fitted by the technician to the cornea of the eye 17 of a contact lens wearer. This identifies the lens and determines the axial position of the main sections. The inscription 13 is so configured that a plus sign characterizes the position of the vertical center axis 19. Signs are arranged to the left and right of this plus sign by means of which each outer vertical line facing away from the plus sign defines an angle (for example 10°) to the next outer vertical graduation of the next sign or to the vertical graduation of the plus sign.

The visibility of the characterization especially in a slit-lamp microscope makes it possible that the perpendicular line indicates in the ocular of the microscope when there is an overlap of the plus sign with the vertical (90°/270° in accordance with the "Technische Ausschuss für Brillenoptik" of the German optical industry). The overlap with the right or left outer vertical graduation of a number laterally of the plus sign amounts to a deviation of +10° or −10° so that the technician can carry out the fine adjustment in a simple manner.

A special problem when seating the contact lens in the open eye 17 of the contact lens wearer is that the contact lens 1 must be seated in its correct position on the cornea of the eye 17. For this reason, the contact lens 1 has a color point 23 having a diameter of approximately 1 mm on the vertical center axis 19 in the upper lens region on the outer zone 4. This color point 23 is subsequently colored onto the already swollen contact lens and assists the wearer thereof to correctly seat the contact lens 1.

The contact lens 1 of the invention is distinguished by the feature that its material thickness is independent of the position stabilization. In this way, an optimal supply of the eye with oxygen is assured. If the permeability DK of a contact lens 1 is considered then the close relationship between lens thickness and oxygen permeability is recognized. Since the position stabilization is independent of the material thickness of the optical zone and of the lens zone 4, an excellent oxygen supply of the eye is assured with the contact lens 1 by a suitable selection of the material.

In FIGS. 2 and 3, the form of the contact lens 1 in the vertical center axis 19 and of the horizontal center axis 18 is almost the same. The connecting zone 6 has its greatest extent in the horizontal center axis 18 and disappears almost completely at the vertical center axis 19.

For the open eye 17, the contact lens 1 normally lies only at a point 20 on the lower eyelid 21a. With an optimal selection of the angles $\alpha_2$ and $\alpha_3$, one obtains a line or surface contact on the lower eyelid 21a which is advantageous because of the pressure distribution on the lower eyelid 21a.

The upper and lower regions (4a, 4b) of the lens outer zone 4 lie above and below the eyelids (21a, 21b) as shown in FIG. 4. This is advantageous so that the wearer of the contact lens perceives the presence of the lens as little as possible. With each closure of the eyelids, the contact lens 1 is again pressed against the lower eyelid with which the lens is in light contact engagement even when the eye 17 is open. In this way, an optimal position stabilization of the contact lens 1 on the cornea of the eye is assured at every point in time.

The contact lens 1 which utilizes this stabilization process can be made of hard as well as soft materials. The overall diameter of the contact lens 1 is advantageously between 12 and 15 mm. The stabilization principle is especially advantageous for contact lenses 1 made of silicone rubber.

It is possible to apply the thickened regions 12 afterwards to an otherwise finished contact lens 1. This is especially easy with dry soft lenses or hard lenses. With forms which can be precisely positioned, blanks (that is, contact lenses which are completed except for the thickened regions) can thereafter be supplied with the thickened regions 12. This makes it especially possible to considerably reduce the variety of lenses which have to be maintained in inventory.

In lieu of one thickened region 12 laterally of each side of the vertical center axis, two thickened regions (22, 23) can be provided on the outer zone 4 of the lens as shown in FIG. 6. Accordingly, at least one additional thickened region 23 is provided above the two thickened regions (22, 22a) on the outer zone 4a of the contact lens 1. The thickened region 23 defines a certain resistance to the downward movement of the upper eyelid 21b when the eyelids blink. A second additional thickened region 23 can be provided above the thickened region 22a.

Also, further means can be provided on the outer surface of the contact lens. This further means can be thickened regions (for example two regions) or a sickle-shaped bevel of the upper outer surface of the contact lens. The means should then advantageously provide a slight resistance with each movement of the upper eyelid in order to provide a directed alignment of the thickened regions on the lower eyelid. From these considerations, it follows that this means must be disposed above the thickened regions on the outer surface of the contact lens. The lower thickened regions can function as a supporting surface on the lower eyelid and the contact lens is stabilized when the eye is open. The other stabilization means would then be defined by a slight resistance for the movement of the upper eyelid when the eyelids are blinked and for aligning the two lower thickened regions relative to the lower eyelid.

It is understood that the foregoing description is that of the preferred embodiments of the invention and that various changes and modifications may be made thereto without departing from the spirit and scope of the invention as defined in the appended claims.

What is claimed is:

1. A contact lens for placement on the cornea of an eye of the lens wearer and for coacting with the upper and lower eyelids of the eye, the contact lens comprising:

a lens body defining a convex outer surface facing outwardly away from the cornea and an inner surface for contact engaging the cornea;

said lens body also defining a horizontal center axis which is horizontal when the lens body is in a position worn by the wearer and a vertical axis transverse to said center axis;

adjusting mean for adjusting the orientation of the lens with respect to the eye of the wearer;

said outer surface being subdivided into a central optical zone having a lower portion below said horizontal center axis, an annular outer zone surrounding said central optical zone and a peripheral zone surrounding said annular outer zone;

said adjusting means including two thickened regions having respective thicknesses relative to said peripheral zone and being disposed in said annular outer zone;

said two thickened regions being disposed laterally of said vertical axis and having respective upper and lower end faces for coacting with the eyelids to dynamically stabilize the lens when the eyelids are blinked; and, said thickened regions extending downwardly below said horizontal center axis and within said annular outer zone so as to cause said lower end faces to be at an elevation on said lens body corresponding substantially to the lowermost region of said lower portion of said central optical zone to permit said lower end faces to rest against the lower eyelid to statically stabilize said lens when the eyelids are open while at the same time causing the lowermost region of said central optical zone to be substantially clear of said lower eyelid.

2. The contact lens of claim 1, further comprising at least one additional region on said outer surface and above said two thickened regions; and, said one additional region being adapted to provide a predetermined resistance to a downward movement of the upper eyelid during an eyelid closure.

3. The contact lens of claim 1, each of said thickened regions being elongated and said upper end face being adapted to receive the upper eyelid thereon while providing a resistance thereagainst.

4. The contact lens of claim 1, said thickened regions and the remainder of the contact lens being made of one and the same material.

5. The contact lens of claim 3, each of said thickened regions having at least two beveled lateral boundary surfaces facing away from each other; and, each of said boundary surfaces extending between said upper and lower end faces.

6. The contact lens of claim 1, said upper and lower end faces being respective concave end faces; each of said thickened regions having inner and outer lateral convex boundary surfaces; and, each of said convex boundary surfaces extending between said upper and lower end faces.

7. The contact lens of claim 6, said thickened regions being arranged on said annular outer zone so as to cause said upper end face to be aligned with said center point.

8. The contact lens of claim 1, further comprising means formed on said outer zone for determining the position of the contact lens on the eye.

9. The contact lens of claim 1, said lens being made of a soft material.

* * * * *

UNITED STATES PATENT AND TRADEMARK OFFICE
CERTIFICATE OF CORRECTION

PATENT NO. : 5,100,225

DATED : March 31, 1992

INVENTOR(S) : Eckhard Rothe

It is certified that error appears in the above-identified patent and that said Letters Patent is hereby corrected as shown below:

In the title page, under "Assignee", reference numeral [73]: delete "fur" and substitute -- für -- therefor.

In the title page, under "Foreign Patent Documents", line 1: delete "8/1889" and substitute -- 8/1989 -- therefor.

In the title page, in the Abstract, line 26: between "be" and "configure", insert -- so --.

In column 5, line 13: delete "a" and substitute -- as -- therefor.

In column 8, line 8: delete "mean" and substitute -- means -- therefor.

Signed and Sealed this

Sixth Day of July, 1993

Attest:

MICHAEL K. KIRK

Attesting Officer

Acting Commissioner of Patents and Trademarks